(12) United States Patent
Haskins et al.

(10) Patent No.: US 9,108,346 B2
(45) Date of Patent: Aug. 18, 2015

(54) METHOD OF FORMING INSULATING ARTICLES WITH REDUCED THICKNESS VARIATION

(71) Applicant: Ford Global Technologies, LLC, Dearborn, MI (US)

(72) Inventors: Harold Haskins, Corvallis, OR (US); Xiao Guang Yang, Northville, MI (US); Theodore James Miller, Milan, MI (US); James Matthew Marcicki, Columbus, OH (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 13/736,427

(22) Filed: Jan. 8, 2013

(65) Prior Publication Data
US 2014/0191446 A1 Jul. 10, 2014

(51) Int. Cl.
| *B29C 43/10* | (2006.01) |
| *B29C 43/14* | (2006.01) |
| *B29C 43/18* | (2006.01) |
| *B29C 43/56* | (2006.01) |
| B29L 31/00 | (2006.01) |
| B29L 31/30 | (2006.01) |
| B29K 105/08 | (2006.01) |

(52) U.S. Cl.
CPC ............. *B29C 43/10* (2013.01); *B29C 43/14* (2013.01); *B29C 43/183* (2013.01); *B29C 43/56* (2013.01); *B29C 2043/148* (2013.01); *B29C 2043/563* (2013.01); *B29K 2105/0854* (2013.01); *B29L 2031/3005* (2013.01); *B29L 2031/7146* (2013.01)

(58) Field of Classification Search
None
See application file for complete search history.

(56) References Cited

U.S. PATENT DOCUMENTS

| 4,486,482 | A | * | 12/1984 | Kobayashi et al. ............. 428/69 |
| 5,094,899 | A | * | 3/1992 | Rusek, Jr. ....................... 428/69 |
| 5,500,305 | A | | 3/1996 | Bridges et al. |
| 5,830,548 | A | | 11/1998 | Andersen et al. |
| 2009/0233038 | A1 | | 9/2009 | Coppersmith |

* cited by examiner

*Primary Examiner* — Monica Huson
(74) *Attorney, Agent, or Firm* — Damian Porcari; Brooks Kushman P.C.

(57) ABSTRACT

In one or more embodiment, a method is provided for forming an insulating article from an insulating material having a first thickness, the method including the step of: compressing the insulating material to form a compressed insulating material having a second thickness smaller than the first thickness; and subsequent to the step of compressing, subjecting the compressed insulating material to a vacuum to form the insulating article.

17 Claims, 3 Drawing Sheets

METHOD OF FORMING INSULATING ARTICLES WITH REDUCED THICKNESS VARIATION

TECHNICAL FIELD

The present invention relates to a method of forming insulating articles with reduced thickness variation.

BACKGROUND

Certain parts of a vehicle have space constraints wherein allowance for linear dimension variation can be very limited. Vehicle battery compartment is one such vehicle part. In the vehicle battery compartment, a battery pack is often housed within a rigid space defined by metal surroundings, with insulating panels disposed in between to provide temperature control for the battery pack. In these instances, changes in both the linear dimensions and the total volume of the insulating panels should be controlled and monitored to prevent unnecessary negative impact to the battery pack. Certain existing insulation panels may, due to variations in manufacturing processes, vary in thickness and/or length dimensions. These variations may not be tolerated in the limited space between the metal box and the battery pack.

SUMMARY

In one or more embodiment, a method is provided for forming an insulating article from an insulating material having a first thickness, the method including the step of: compressing the insulating material to form a compressed insulating material having a second thickness smaller than the first thickness; and subsequent to the step of compressing, subjecting the compressed insulating material to a vacuum to form the insulating article.

The method may further include, subsequent to the step of compressing, the step of depositing the compressed insulating material into a container.

The method may further include, prior to the step of compressing, the step of depositing the insulating material into a container. To carry out the step of compressing, a load of pressure may be applied onto the container. The method may further include the step of closing the container such that a pressure within the container is smaller than a pressure outside of the container.

The step of compressing is optionally carried out with a load of pressure greater than atmospheric pressure.

The step of compressing is optionally carried out in an environment with a pressure no less than atmospheric pressure.

The step of compressing is optionally carried out using a system of adjustable rollers with a thickness gauge that can be set to achieve a desirable final thickness of the insulating article.

DETAILED DESCRIPTION

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The present invention, in one or more embodiments, provides a solution to at least some of the issues involved with the existing insulating panels. The solution is particularly directed to a reduction of variation in the thickness dimension in a resultant insulating panel. As will be detailed herein below, a non-limiting process of forming such insulating panels includes the employment of a compression step prior to steps usually carried out in a vacuum. As this compression step is done in a non-vacuum setting, optionally with a compression load or compressive force, core materials contained within a barrier layer have been degassed and consolidated with the application of the compression load. As a result, the resultant compressed panel has a less tendency to rebound with a subsequent application and withdrawal of a vacuum. In addition, this compression step can be carried out simply at an atmospheric pressure, the cost of employing this compression step can be at a bare minimal, while the benefit of obtaining an end product with much reduced thickness variation can be substantially significant for uses with space limitations.

Figure 1:
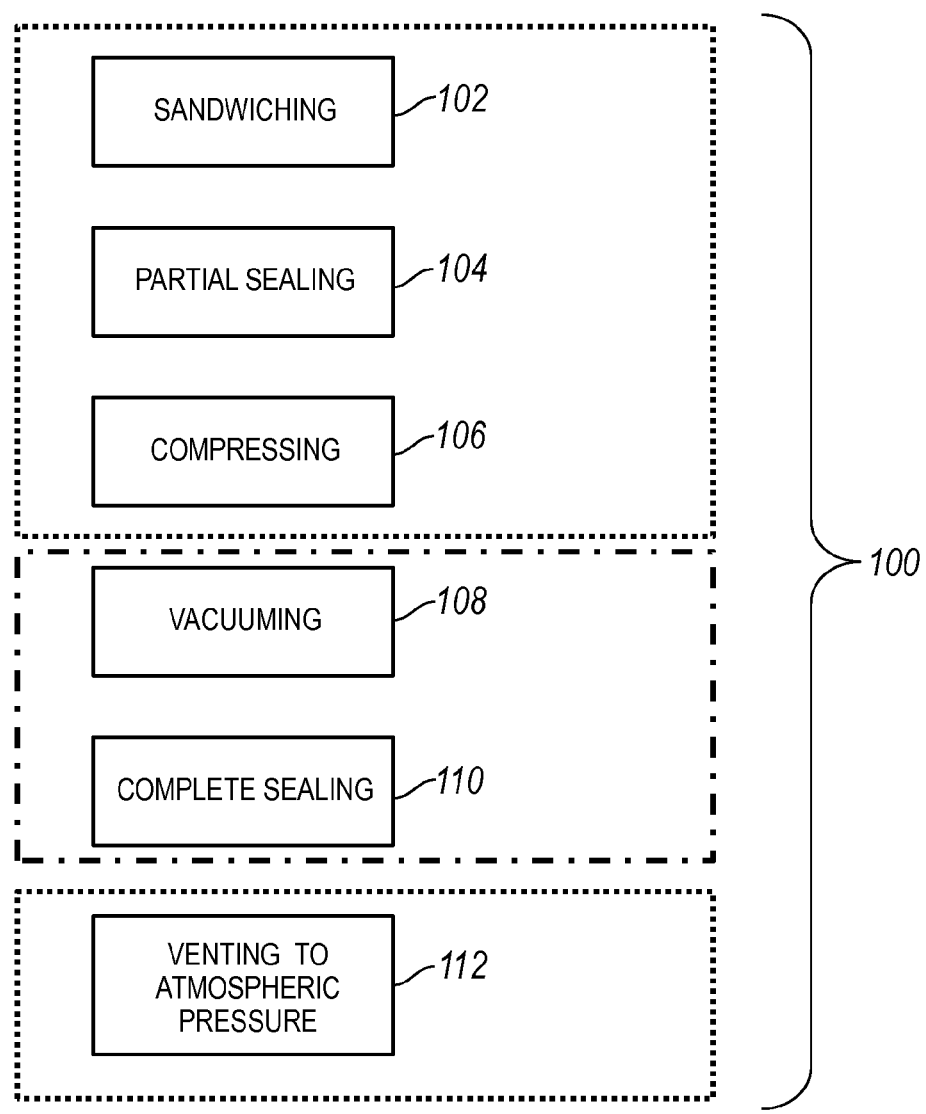
FIG. 1 illustratively depicts a non-limiting process for forming an insulating article, according to one or more embodiments of the present invention.

A non-limiting process 100 of forming an insulating article such as an insulating panel suitable for use in a vehicle battery compartment is depicted in FIG. 1. As depicted in FIG. 1, the process 100 may include steps 102, 104, 106, 108, 110 and 112.

Figures 2A, 2B:
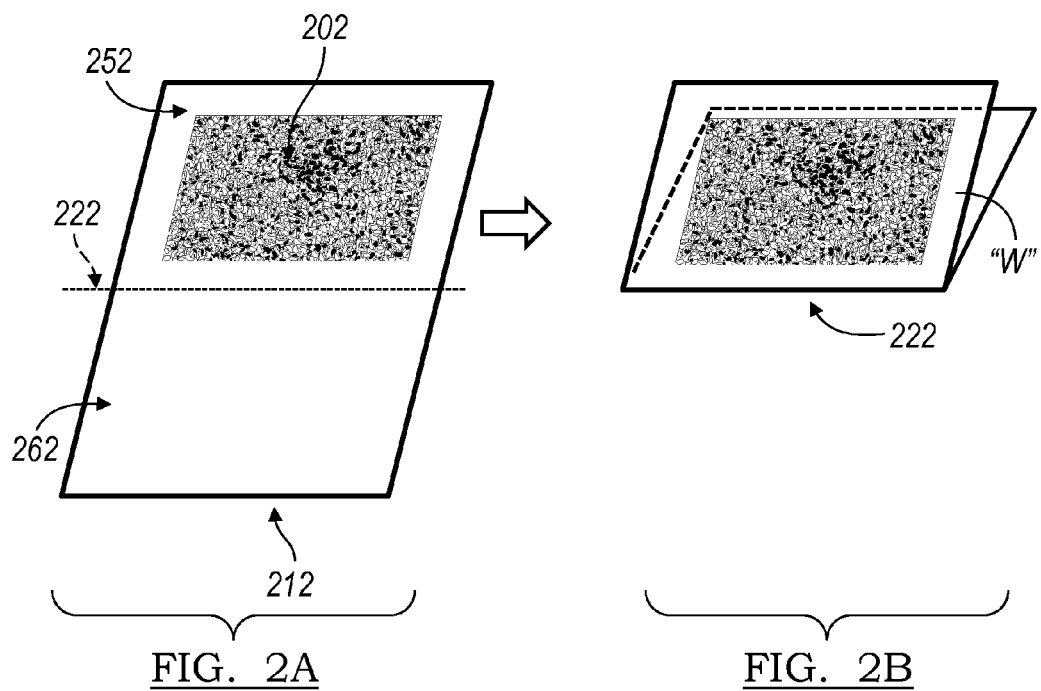
FIG. 2A illustratively depicts a step referenced in the process of FIG. 1, wherein an insulating material is placed relative to a barrier film in preparation for forming an insulating article.
FIG. 2B illustratively depicts another step referenced in the process of FIG. 1 and in view of FIG. 2A, wherein the barrier film is folded over to form a sandwich of the insulating material.

At step 102, and further in view of FIG. 2A, the process 100 may start with placing an insulating material 202 onto a barrier layer 212. The barrier layer 212 is depicted to include a first portion 252 and a second portion 262 separated by a folding line 222. The insulating material 202 may be positioned on the first portion 252 of the barrier layer 212 such that the insulating material 202 does not pass beyond the separating line 222 or touch upon the second portion 262 of the barrier layer 212.

Referring back to step 102, and further in view of 2B, the second portion 262 of the barrier layer 212 gets folded over, in a direction shown at "W", towards the first portion 252, such that the insulating material 202 is sandwiched between the first portion 252 and the second portion 262. At this stage, three of the four sides of the resultant sandwich are not closed or sealed.

Figure 2C:
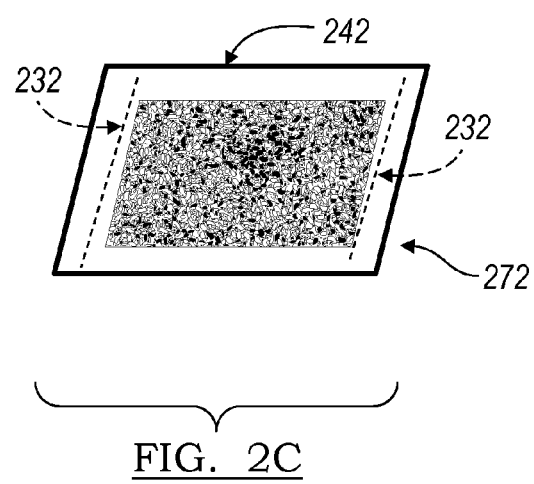
FIG. 2C illustratively depicts another step referenced in the process of FIG. 1 and in view of FIG. 2C, wherein the sandwich of the insulating material is sealed on two sides to form a partially sealed sandwich.

At step 104, and further in view of FIG. 2C, two opposing sides 232 of the folded sandwich are sealed to form a partially sealed sandwich generally shown at 272. At this stage, an end side 242 of the four sides of the partially sealed sandwich 272 remains open or un-sealed.

The sides 232 may be substantially perpendicular to the folding line 222. At this stage, the barrier layer 104 has been formed into a pocket with end side 242 open and unsealed. It is optional that the end side 242 may be left unsealed or partially sealed to be a vent opening with a width suitable for gas diffusion. In certain instances, the width can be no less than 1 mm, 2.5 mm, 5 mm, 7.5 mm or 10 mm to ensure air vent during the compression.

Steps 102 to 104 can be carried out with any suitable variations. One variation is that the barrier layer 212 can be provided as a preformed sack with three sides already closed or sealed, wherein only one of the four sides remains open for receiving the insulating material 202. Optionally, this only one side may be reduced to a vent opening with an opening size of no less than 1 mm, 2.5 mm, 5 mm, 7.5 mm or 10 mm, as stated herein elsewhere.

Although a substantially rectangular form of the barrier layer 212 is depicted in FIGS. 2A to 2C and the process 100 has been detailed in relation to the insulating material 202 being sandwiched within a substantially rectangular form, these configurations are merely presented for illustration purposes and are not intended to place a limit on the shapes of the barrier layer 212, the insulating material 202 or the resultant sandwich 272. In this connection, the barrier layer 212 can be provided as a circle, an oval, a square, or any other geometric shapes. It is possible that the barrier layer 212 can be of an asymmetrical shape for cost considerations, as these materials can be cheap remnants of other unrelated manufacturing processes. Similarly, the insulating material 202 can be filled into a shell formed by the asymmetrical barrier layer 212. The sealing and cutting can be employed subsequently to impart a desirable shape to the sandwich or dumpling.

One common feature to all the steps 102 and 104 and their variation detailed above is that the barrier layer 212 is configured as a housing to contain the insulating material 202, with a vent opening present on the barrier layer 212 for degassing during subsequent process steps. There is no particular requirement on how big or small the vent opening should be as long as the vent opening provides adequate venting during the downstream compression as will be detailed in FIGS. 3A to 3B. In certain instances, the vent opening can be the entire side 242 of the partially sealed sandwich 272 or any portion of the side 242 if other portions of the side 242 are also sealed during the partial sealing step. The vent opening may be provided with an opening dimension no less than 1 mm, 2.5 mm, 5 mm, 7.5 mm, or 10 mm to ensure air vent during the compression, as stated herein elsewhere.

As mentioned in various steps of the process of FIG. 1, the step of sealing may be carried out in any suitable methods and the selection of a particular sealing method may depend on the material with which the barrier layer 212 is formed. For instance, in the event that the barrier layer 212 is formed of a metallic sheet such as an aluminum sheet, adhesives may be applied along the lines of the barrier layer 212 where sealing will take place. The adhesives can be temperature sensitive. The sealing can then take place upon the application of heat to the parts of the barrier layer 212 where the sealing is intended.

Figure 3A:
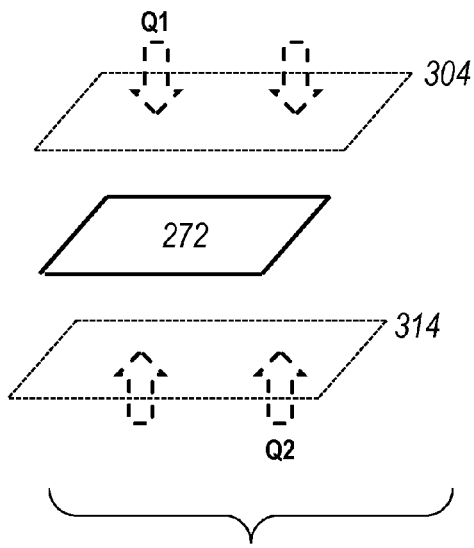
FIG. 3A illustratively depicts another step referenced in the process of FIG. 1 and in view of FIG. 2C, wherein the partially sealed sandwich is compressed to form a compressed partially sealed sandwich.

At step 106, and further in view of FIG. 3A, the partially sealed sandwich 272 is placed in between a set of compression plates 304, 314, upon which a force collectively defined as Q1-Q2 is applied to the partially sealed sandwich 272 via the compression plates 304, 314. The pre-compression load Q1-Q2 can be applied using any suitable ways. The load Q1-Q2 can be applied using a dead load such as steel plates like the compression plates 304, 314 depicted in FIGS. 3A-3C, and also be applied with a hydraulic fixture.

Alternatively, a pair of rollers may be used to apply the load, with a suitable adjustable gauge for controlling the spacing between the rollers to achieve the desirable thickness of the insulating article.

The load of Q1-Q2 may be of any suitable values greater than atmospheric pressure. In certain instances, the load 14.5 to 22 psi, 15.5 to 20 psi or 16.5 to 18 psi. Without wanting to be limited to any particular theory, it is believed that this amount of load is advantageous in imparting a thickness in the insulating material 202 that is relatively more suited for the subsequent vacuuming and compression steps with reduced extent of rebound or thickness variation.

As detailed herein above, the second thickness T2 can be of any suitable value relative to the first thickness T1, and in particular is adjustable via the use of the shim stock 324. In certain instances, T2 is 40% to 90%, 50% to 80%, or 60% to 70% of T1.

Figure 3B:
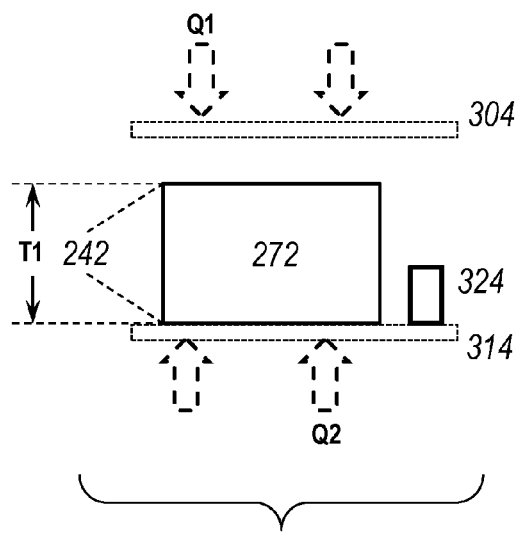
FIG. 3B illustratively depicts a cross-sectional view of FIG. 3A.
Figure 3C:
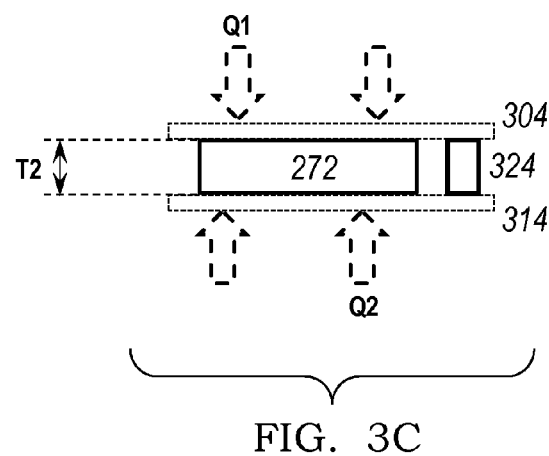
FIG. 3C illustratively depicts a cross-sectional view of FIG. 3A after the compression is completed.

FIG. 3B depicts a cross-section of FIG. 3A. In this view, the side 242 operates as a vent opening during the compression step. A shim stock 324 may be provided alongside the partially sealed sandwich 272 as a controller for a resultant thickness of the sealed sandwich 272 after compression.

For instance, prior to mechanically compressing the partially sealed sandwich 272 may have a thickness of T1. After the compression by the application of compression load Q1-Q2, with further view of FIG. 3C, the partially sealed sandwich 272 is now with a thickness T2 which is smaller than T1. The thickness of the shim stock 324 presets the targeted thickness T2 of the compressed partially sealed sandwich 372. Therefore, the compression step can be easily modified via the use of the shim stock 324 with variable thickness values.

The use of a relatively thicker shim stock 324 may result in less compressed partially sealed sandwich; and likewise, the use of a relatively thin shim stock 324 may result in a more compressed partially sealed sandwich.

As depicted in FIG. 1D, the barrier layer 104 as folded is subjected to a pair of opposing forces shown at arrow Q1 and Q2 such that the insulating material 202 sandwiched within the barrier layer 212 is compressed to have a reduced thickness. The pair of opposing forces Q1 and Q2 may be effectuated by placing a pair of weight bearing plates 114, 116 to sandwich the barrier layer 104 as folded with the pair of opposing forces. At this step, the opening along the end 112 helps diffuse gases exiting from the compressing step.

In addition, more than one shim stock 324 may be placed near and/or around the partially sealed sandwich 272 to provide a more uniform compression. Moreover, two or more blocks 324 with different thickness values can be used in the compression step to create a compressed partially sealed sandwich with a slope of thickness, meaning one side with a relatively smaller thickness and an opposing side with a relatively greater thickness. This may be useful for certain confined spaces with uneven distribution of sizes.

Among other things, creating an insulating article with non-uniform shapes such as with a thickness slope may be very unique to the process 100 of FIG. 1, in comparison to some exiting insulating technologies wherein compression is often carried out in a vacuum, which does not readily accommodate the application of compression loads with thickness control blocks of various thickness values.

As can be seen from FIG. 1 and at steps 102 to 104 detailed herein above, the process steps up till this point can all be carried out at atmospheric pressure.

Steps 108 and 110, as referenced in FIG. 1, are carried out in a vacuum. At step 108, the compressed partially sealed sandwich 272 is placed in a vacuum and is evacuated to a desirable vacuum value. The desirable vacuum level can be less than 10 mbar, 7.5 mbar, 5 mbar, 2.5 mbar, 1 mbar or 0.1 mbar.

At step 110, the compressed partially sealed sandwich 272 with the desirable vacuum is then sealed at the side 242 to reduce and/or eliminate gas diffusion. The panel edges can be heat-sealed to maintain this high vacuum over the intended panel life. Panels can be tested in a quality assurance fixture that verifies the desired thermal insulation performance.

At step 112, after the desired vacuum level has been achieved the barrier film is sealed completely and the vacuum chamber is vented to atmosphere. Upon an exposure to the atmospheric pressure, the insulating material may experience another compression due to the pressure differential between an inside of the barrier layer and an outside of the barrier layer 212. However, due to the mechanical compression exercised prior to the vacuuming step, the potential for the insulating material 202 to rebound upon withdrawal of the vacuum is much diminished. Accordingly, a resultant insulating panel can be provided with relatively more uniform thickness distribution across the surface area and hence less thickness variation.

Although much of the description stated herein is directed to an insulating article with a generally planar configuration, the insulating article formed via the process 100 can be of any suitable shape and configuration. For instance, the existing vacuum thermal insulation panels may be fabricated by using a vacuum chamber to evacuate a panel core which has been inserted into a barrier film that has been pre-sealed on three of its four edges. This invention may be used with any planar configuration of a panel. It may also be used for slightly non-planar panels, for example a shallow dish configuration. In the case of non-planar articles, a non-planar fixture with outer shapes complimentary to those of the targeted articles may be used during the vacuuming and complete sealing processes 108 and 110.

The tolerance for the resultant insulating article prepared according to the process 100 can be smaller than what would be expected of a control article without the atmospheric compression step 106 depicted in FIG. 1. The resultant insulating article prepared according to the process 100 may be provided with a thickness tolerance of less than 1.70 mm, 1.50 mm, 1.30 mm, 1.10 mm, 0.90 mm or 0.70 mm.

In certain instances, the insulating material 202 is in the form of a number of fiberglass layers; and accordingly, the achievable thickness tolerance may be limited due to the particularity of the fiberglass material, wherein the panel thickness will be determined by the number of layers used. Variations in this nominal thickness will occur due to variations in the actual atmospheric pressure at the time of sealing, and due to variation in the compressibility of each of the multiple layers in the core. The present invention in one or more embodiments seeks to reduce this variation by slightly over-compressing the insulating material 202 prior to vacuum evacuation and sealing. If the amount of over-compression is controlled by an apparatus that determines the compressed thickness the variation can be reduced to negligible amount, much less than that obtained using atmospheric pressure. If the over-compression is obtained by using an over-atmospheric pressure load on the panel the variation will be reduced, but may be larger than using a controlled thickness. The compressed core will have a small "rebound" after being over-compressed, but the subsequent application of atmospheric pressure will restore the thickness to its desired value. The amount of out-of-plane panel warpage will also be reduced by the controlled over-compression, relative to the uncontrolled atmospheric compression of the present method wherein the panel is much less constrained to be planar during the compression step. Panels that are non-planar by design (e.g., a shallow dish shape) will need to be constrained by appropriately shaped fixture material during the over-compression step proposed in this invention.

In one or more embodiments, the present invention is advantageous in providing a method for forming thermal insulation panels with reduced thickness tolerance and/or variation and out-of-plane warpage. The thickness design tolerance will still depend on using the desired number of fiberglass layers in the core. The invention will provide reduced thickness variation and out-of-plane warpage. In particular, this method includes the step of compressing an unsealed panel prior to evacuation of the panel core. The over-compression is done prior to panel evacuation and sealing in order to avoid damage to the barrier films by further collapse of the panel core.

The present invention, in one or more embodiments, is advantageous in providing an insulation article with a linear dimension variation of less than 0.45%, 0.35%, 0.25%, or 0.15%. Such that the end product has improved dimensional stability. This dimension stability may be particularly appreciated in the vehicle battery compartment to reduce the risk of thermal leakage induced by unwanted gaps between adjacent insulation panels.

Although the insulation panels can be of any suitable dimensions, the insulation panels for use in the vehicle battery compartment are usually about 0.5 to 2 m for the length and the width. In certain instances, the insulation panels are 0.75 to 1.25 m for the length and the width.

The insulating material 202 can include any suitable compressible materials to impart a desirable thickness to the resultant insulating article. The insulating material 202 may include one or more of the following compressible materials: silica, fumed silica and glass fibers.

The insulating material 202 can be a population of compressible particles, and can also be a number of compressible sheet layers. When configured as a population of particles, the particles can be of any suitable geometrical shapes and can be of any suitable sizes. When configured as a number of sheet layers, the sheet layers can each be of a sample material, size or dimension, and can also be of variable size, dimension or of a different material. In certain instances, the insulating material 202 can be a stack of 2 to 10 fiberglass layers assembled together.

The barrier layer 212 can be formed of any suitable materials such as a plastic, an organic polymer, and inorganic polymer, which tends to effectuate minimum diffusion of atmospheric gases into and out of the barrier layer 212. Some barrier films may be metalized to further reduce or eliminate all gas diffusion. A metallic film such as an aluminum film can be one non-limiting example of such material for forming the barrier layer 212.

Having generally described several embodiments of this invention, a further understanding can be obtained by reference to certain specific examples which are provided herein for purposes of illustration only and are not intended to be limiting unless otherwise specified.

Example

In this example, a number of fiberglass layers are assembled together and trimmed to size to form the insulating material. The insulating material is placed on an oversized barrier film which is then folded over and sealed along the two edges perpendicular to the folded edge. The final edge, opposite the folded edge, is not sealed. This partially sealed sandwiched panel is then over compressed with a compression load of 17 psi at atmospheric pressure. The compressed partially sealed panel is then placed in a vacuum chamber for evacuation and final edge sealing. The fully sealed panel is then withdrawn from the vacuum and exposed to air. The resultant panel is observed to have a 1% variation in thickness as opposed to a control panel without the atmospheric pressure pre-compression which exhibits a 5% variation in thickness, thus significantly reducing the variation in its final thickness.

While the best mode for carrying out the invention has been described in detail, those familiar with the art to which this invention relates will recognize various alternative designs and embodiments for practicing the invention as defined by the following claims.

What is claimed:

1. A method of forming an insulating article from an insulating material having a first thickness, the method comprising:
   compressing the insulating material to form a compressed insulating material having a second thickness smaller than the first thickness;
   subsequent to the step of compressing, subjecting the compressed insulating material to a vacuum to form the insulating article; and prior to the step of compressing, depositing the insulating material into a container that includes an opening greater than 1 millimeter subsequent to the step of vacuuming.

2. The method of claim 1, wherein the insulating material is provided to include a glass fiber.

3. The method of claim 1, wherein the container comprises a barrier layer.

4. The method of claim 1, wherein the compressing is carried out at atmospheric pressure.

5. The method of claim 1, wherein the step of compressing is carried out with a compressive load of 14.5 to 22 psi.

6. The method of claim 1, wherein a compressive force is applied onto the container to carry out the step of compressing.

7. The method of claim 1, wherein the container includes at least one of a polymer, a plastic and a metal.

8. The method of claim 1, wherein the opening is closed such that a pressure within the container is smaller than a pressure outside of the container.

9. The method of claim 8, wherein the opening is closed via an application of heat.

10. The method of claim 1, wherein the step of compressing is carried out such that a thickness ratio of a thickness after the compressing relative to a thickness before the compressing is 0.40 to 0.95.

11. A method of forming an insulating article comprising:
    depositing insulating material having a first thickness in a container with an opening;
    compressing the insulating material at atmospheric pressure to form a compressed insulating material having a second thickness smaller than the first thickness; and
    subjecting the compressed insulating material to a vacuum to form the insulating article, the container including an opening greater than 1 centimeter subsequent to the vacuuming step.

12. The method of claim 11, wherein a load of pressure is applied onto the container to carry out the step of compressing.

13. The method of claim 11, wherein the opening is closed such that a pressure within the container is smaller than a pressure outside of the container.

14. The method of claim 13, wherein the opening is closed via an application of heat.

15. The method of claim 11, wherein the step of compressing is carried out such that a thickness ratio of a thickness after the compressing relative to a thickness before the compressing is 0.40 to 0.95.

16. A method of forming an insulation panel, comprising:
    providing a pre-sealed insulation panel having a first thickness, the pre-sealed insulation panel including a flexible container and an insulation material disposed within the flexible container, the flexible container including an opening;
    compressing the pre-sealed insulation panel to form a compressed pre-sealed insulation panel, the compressed pre-sealed insulation panel having a second thickness smaller than the first thickness;
    vacuuming the compressed pre-sealed insulation panel to form a vacuumed pre-sealed insulation panel; and
    sealing the opening of the flexible container of the vacuumed pre-sealed insulation panel to form the sealed vacuumed insulation panel, the container including an opening greater than 1 centimeter subsequent to the vacuuming step.

17. The method of claim 16, further comprising subjecting the sealed vacuumed insulation panel to atmospheric pressure.

* * * * *